United States Patent
Kobayashi et al.

(10) Patent No.: US 11,618,466 B2
(45) Date of Patent: Apr. 4, 2023

(54) VEHICLE CONTROL APPARATUS, VEHICLE, OPERATION METHOD OF VEHICLE CONTROL APPARATUS, AND STORAGE MEDIUM

(71) Applicant: HONDA MOTOR CO., LTD., Tokyo (JP)

(72) Inventors: Takuma Kobayashi, Wako (JP); Yoshifumi Nakamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 150 days.

(21) Appl. No.: 17/155,212

(22) Filed: Jan. 22, 2021

(65) Prior Publication Data
US 2021/0237753 A1    Aug. 5, 2021

(30) Foreign Application Priority Data
Jan. 31, 2020 (JP) .............................. JP2020-015479

(51) Int. Cl.
B60W 50/08 (2020.01)
B60W 30/14 (2006.01)
B60W 40/04 (2006.01)
B60W 30/18 (2012.01)

(52) U.S. Cl.
CPC ........ *B60W 50/082* (2013.01); *B60W 30/146* (2013.01); *B60W 30/18163* (2013.01); *B60W 40/04* (2013.01); *B60W 2530/18* (2013.01); *B60W 2552/10* (2020.02)

(58) Field of Classification Search
CPC ............. B60W 50/082; B60W 30/146; B60W 30/18163; B60W 40/04; B60W 2552/10; B60W 2530/18
See application file for complete search history.

(56) References Cited

U.S. PATENT DOCUMENTS

| | | | |
|---|---|---|---|
| 10,543,850 B2 * | 1/2020 | Chen ..................... | B60W 30/16 |
| 10,549,780 B2 | 2/2020 | Watanabe et al. | |
| 2005/0267684 A1 * | 12/2005 | Kawakami ........... | B62D 15/025 |
| | | | 180/170 |
| 2017/0203770 A1 * | 7/2017 | Kondo ................. | B60W 60/005 |
| 2018/0065664 A1 | 3/2018 | Watanabe et al. | |
| 2018/0194365 A1 * | 7/2018 | Bae ....................... | B60W 50/14 |
| 2018/0319402 A1 * | 11/2018 | Mills .................... | B60W 50/14 |
| 2021/0206396 A1 * | 7/2021 | Carbaugh ............. | G05D 1/0088 |

FOREIGN PATENT DOCUMENTS

JP        2018039412 A    3/2018

* cited by examiner

*Primary Examiner* — Jeff A Burke
*Assistant Examiner* — Mohamad O El Sayah
(74) *Attorney, Agent, or Firm* — Thomas | Horstemeyer, LLP

(57) ABSTRACT

A vehicle control apparatus that controls a vehicle based on peripheral information of the vehicle, comprising: a first operator used to start first travel control; a second operator used to resume the first travel control after the first travel control has been terminated; a third operator used to further start second travel control during the first travel control; and a control unit configured to, while the first travel control and the second travel control are active, if the first travel control and the second travel control are terminated based on the same condition or the same timing, resume the first travel control and the second travel control in accordance with an operation of the second operator.

13 Claims, 9 Drawing Sheets

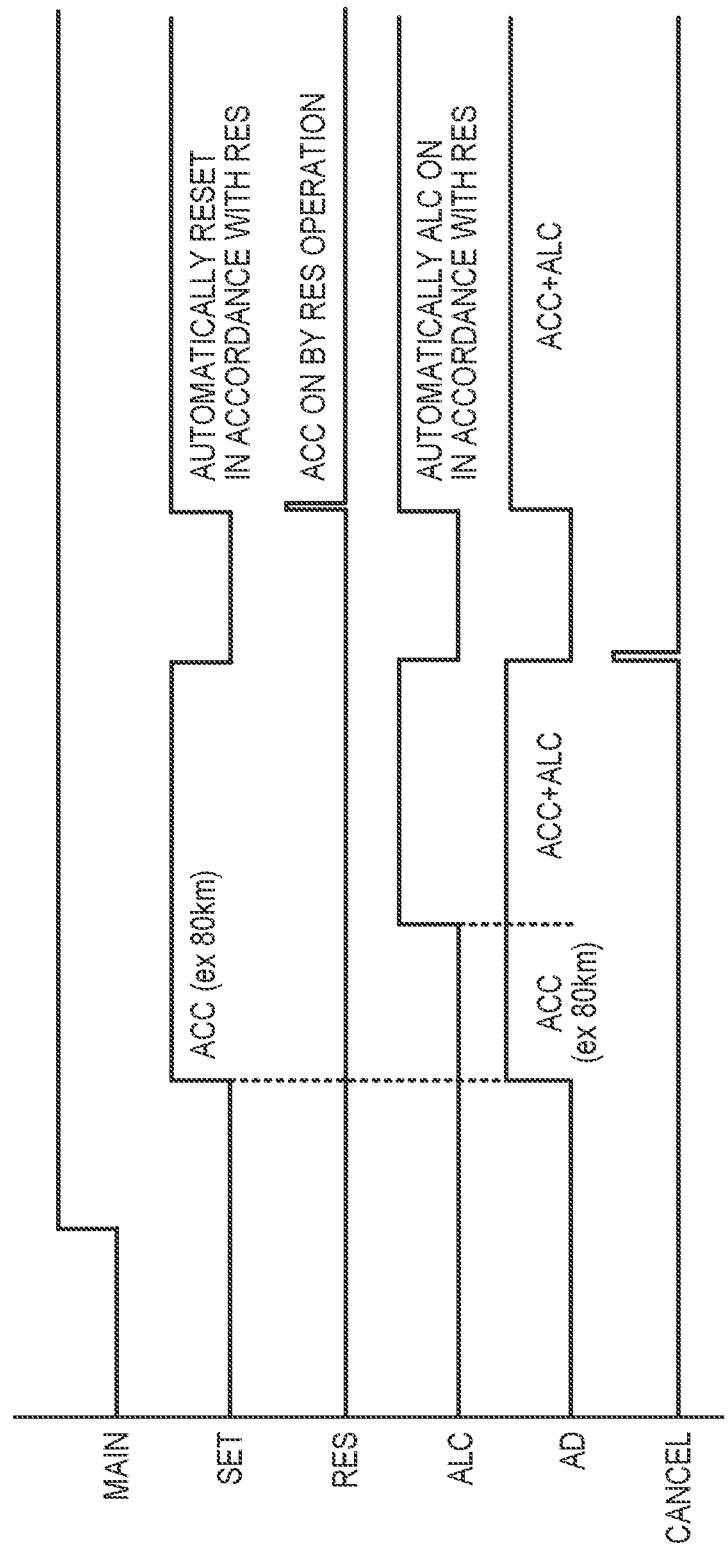

VEHICLE CONTROL APPARATUS, VEHICLE, OPERATION METHOD OF VEHICLE CONTROL APPARATUS, AND STORAGE MEDIUM

CROSS-REFERENCE TO RELATED APPLICATION(S)

This application claims priority to and the benefit of Japanese Patent Application No. 2020-015479 filed on Jan. 31, 2020, the entire disclosure of which is incorporated herein by reference.

BACKGROUND OF THE INVENTION

Field of the Invention

The present invention relates to a vehicle control apparatus, a vehicle, an operation method of the vehicle control apparatus, and a storage medium.

Description of the Related Art

Japanese Patent Laid-Open No. 2018-039412 discloses that overtaking driving is performed based on an operation of an operation unit used to change the set vehicle speed during automated driving.

However, the technique described in Japanese Patent Laid-Open No. 2018-039412 has a problem that in order to restore the original travel control state after the travel control is terminated, it is required to operate a plurality of buttons, so that a complicated operation is required.

The present invention has been made in consideration of the above-described problem, and has as its object to provide a technique for restoring the original travel control state with a simple operation.

SUMMARY OF THE INVENTION

According to one aspect of the present invention, there is provided a vehicle control apparatus that controls a vehicle based on peripheral information of the vehicle, comprising: a first operator used to start first travel control; a second operator used to resume the first travel control after the first travel control has been terminated, a third operator used to further start second travel control during the first travel control; and a control unit configured to, while the first travel control and the second travel control are active, if the first travel control and the second travel control are terminated based on the same condition or the same timing, resume the first travel control and the second travel control in accordance with an operation of the second operator.

BRIEF DESCRIPTION OF THE DRAWINGS

FIG. 9 is a view showing the state transition in the automated driving process according to the fourth embodiment.

DESCRIPTION OF THE EMBODIMENTS

Figure 1:
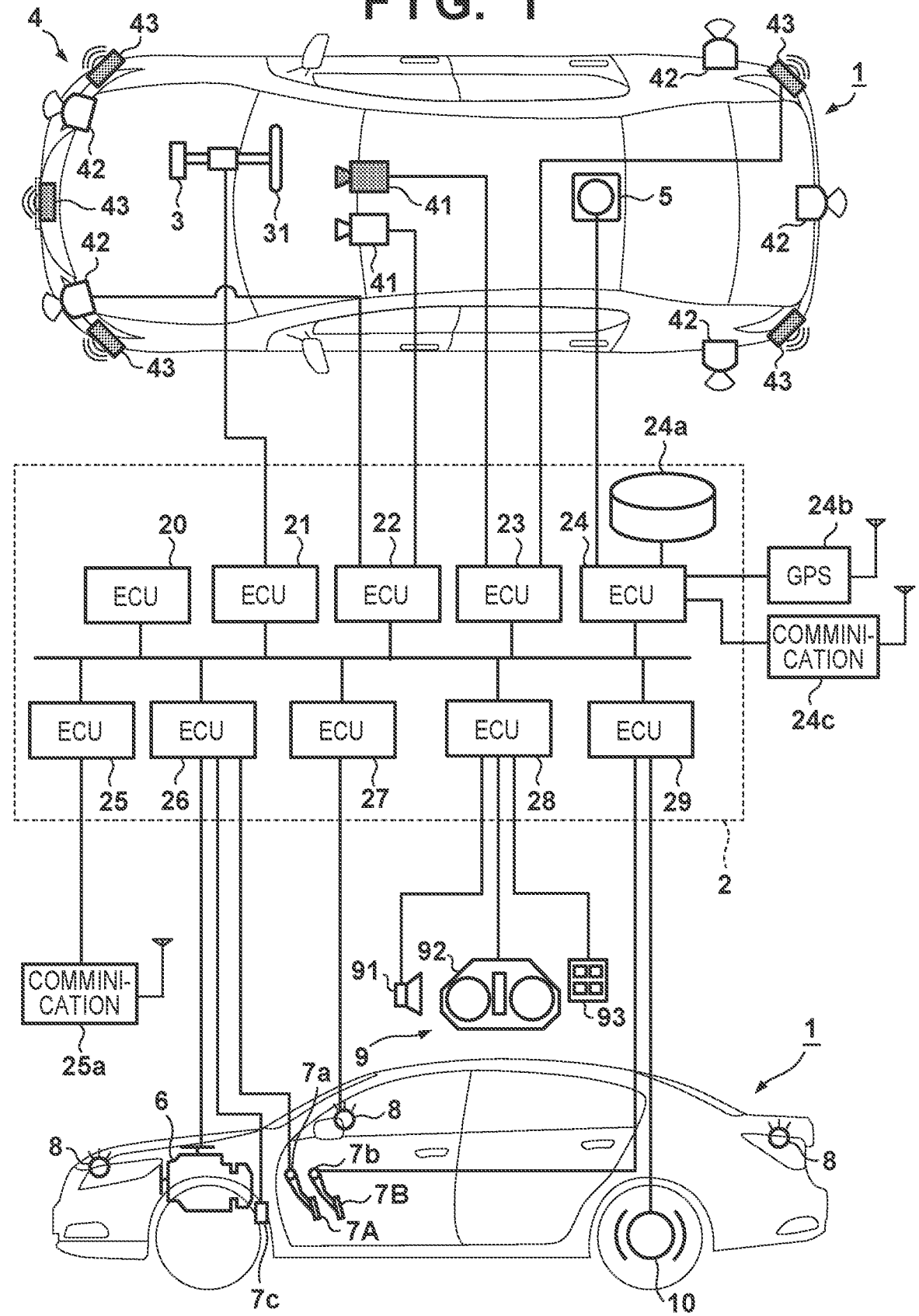
FIG. 1 is a view showing a vehicle and a block diagram of a vehicle control apparatus according to an embodiment.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a view showing a vehicle and a block diagram of a vehicle control apparatus according to an embodiment of the present invention. FIG. 1 shows the outline of a vehicle 1 by a plan view and a side view. The vehicle 1 is, for example, a sedan-type four-wheeled vehicle.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled.

The ECU 21 controls an electric power steering device 3. The electric power steering device 3 includes a mechanism that steers front wheels in accordance with a driving operation (steering operation) of a driver on a steering wheel (steering device) 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved. In addition, since detection units of different types such as cameras, LiDARs, and radars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice. A display device 92 notifies the driver of information by displaying an image. The display device 92 is arranged, for example, in front of the driver's seat and constitutes an instrument panel or the like. Note that although notification of information by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified. An input device 93 is a switch group that is arranged at a position where the driver can perform an operation, is used to issue an instruction to the vehicle 1, and may also include a voice input device.

The ECU 29 controls a brake device 10 and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stationary state of the vehicle 1. In addition, if the transmission of the power plant 6 includes a parking lock mechanism, it can be operated to maintain the stationary state of the vehicle 1.

<Display Screen and Arrangement of Operators>

Next, with reference to FIGS. 2 and 3, an example of a display screen and operators according to this embodiment will be described.

Figure 2:
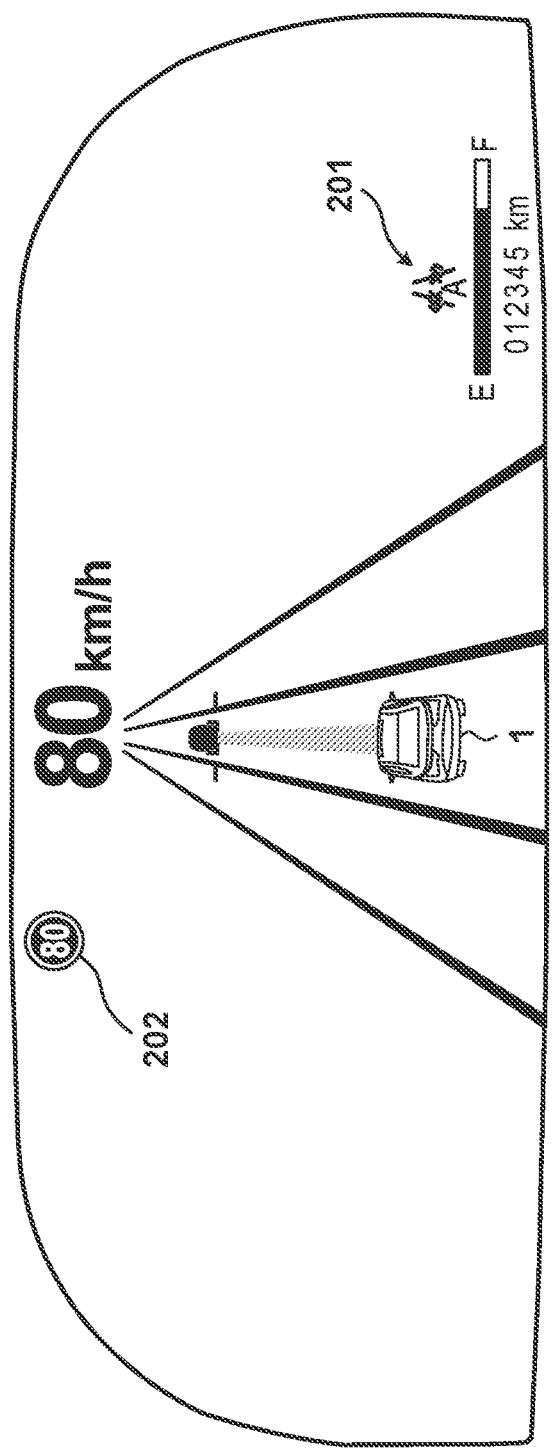
FIG. 2 is a view showing a display example of a display screen according to the embodiment.

FIG. 2 is a view showing a display example of a display screen according to the embodiment. FIG. 2 shows a display example in a case in which an ACC (Adaptive Cruise Control) function for allowing the vehicle 1 to follow the preceding vehicle at a vehicle speed of 80 km/h on a road with a legal speed 202 of 80 km/h is active. An icon 201 indicates that an ALC (Automatic Lane Change) function is active.

Figure 3:
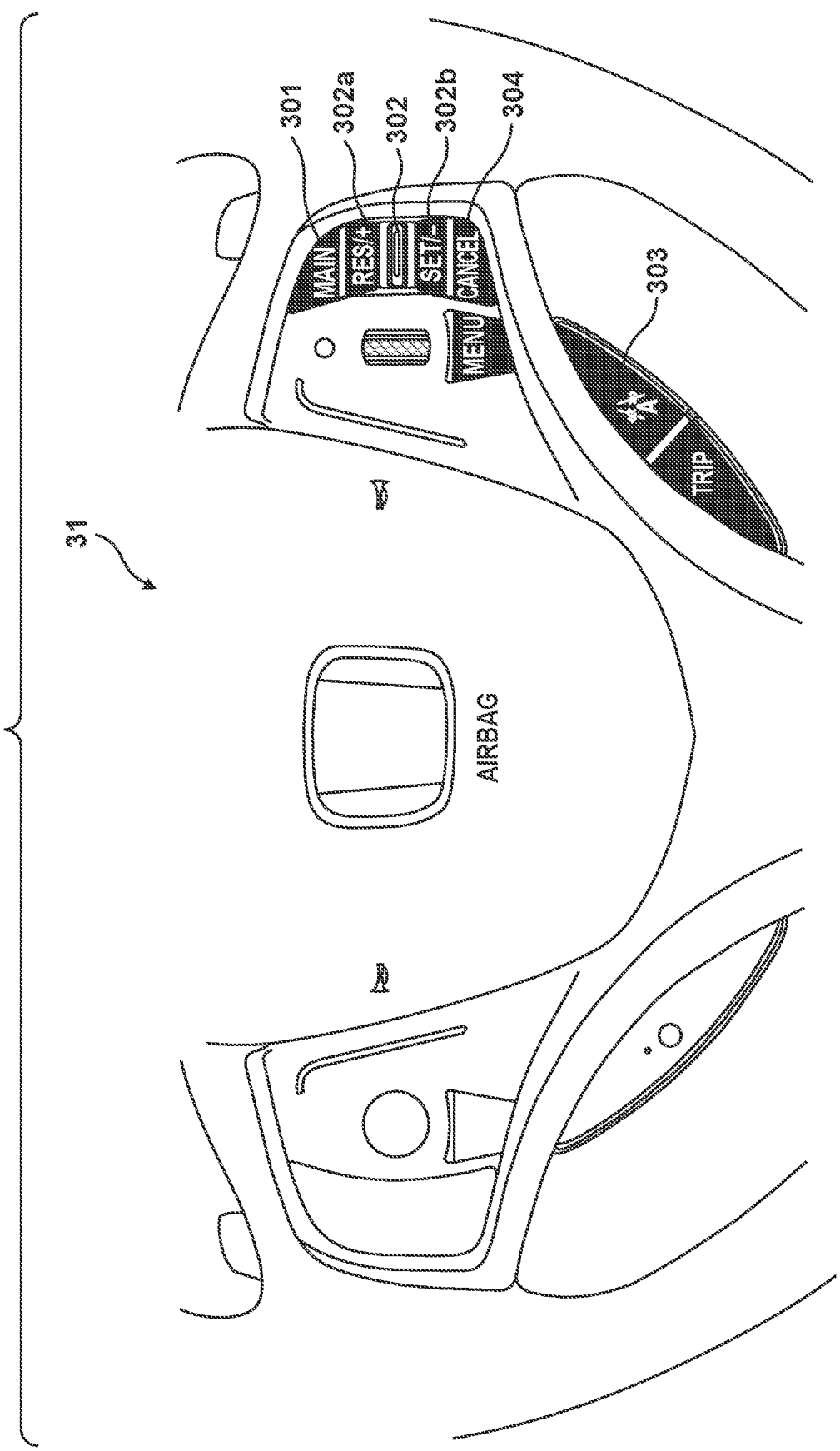
FIG. 3 is a view showing an arrangement example of operation buttons on a steering device according to the embodiment.

FIG. 3 is a view showing an arrangement example of each operator (switch) on the steering device 31 according to the embodiment. The steering device 31 includes an automated driving system main (MAIN) switch 301, an ACC set switch 302, an ALC active switch 303, and a cancel (CANCEL) switch 304.

If the automated driving system main switch 301 is turned on, the vehicle 1 transitions to an automated driving state. If the ACC set switch 302 is tilted toward the side of SET 302b based on a user operation, the ACC function is turned on. After the ACC function is terminated, if the ACC set switch 302 is tilted toward the side of RES (resume) 302a based on a user operation, the ACC function is turned on again. That is, after the operation of the ACC function is terminated, the ACC function is resumed. "Resume" here means that the original state before the function is stopped is reproduced, but it is not limited to the reproduction of the original state, and also includes simply activating the function. Note that in the illustrated example, the two functions of the set function and the resume function are activated by tilting the ACC set switch 302 to different directions, but a set button and a resume button may be provided separately. If the ALC active switch 303 is turned on, the ALC function is turned on, and the vehicle 1 can automatically change the lane. If the cancel switch 304 is turned on during execution of the first travel control in which the ACC function is active and/or the second travel control in which the ALC function is active, the first travel control and/or the second travel control is terminated.

<Process>

Here, control associated with automated driving of the vehicle 1 executed by the ECU 20 will be described. If the driver instructs a destination and automated driving, the ECU 20 automatically controls travel of the vehicle 1 toward the destination in accordance with a guide route searched for by the ECU 24. In the automatic control, the ECU 20 acquires information related to the peripheral state of the vehicle 1 from the ECUs 22 and 23 and, based on the acquired peripheral information, instructs the ECUs 21, 26, and 29 to control steering and/or acceleration/deceleration of the vehicle 1.

Figure 4:
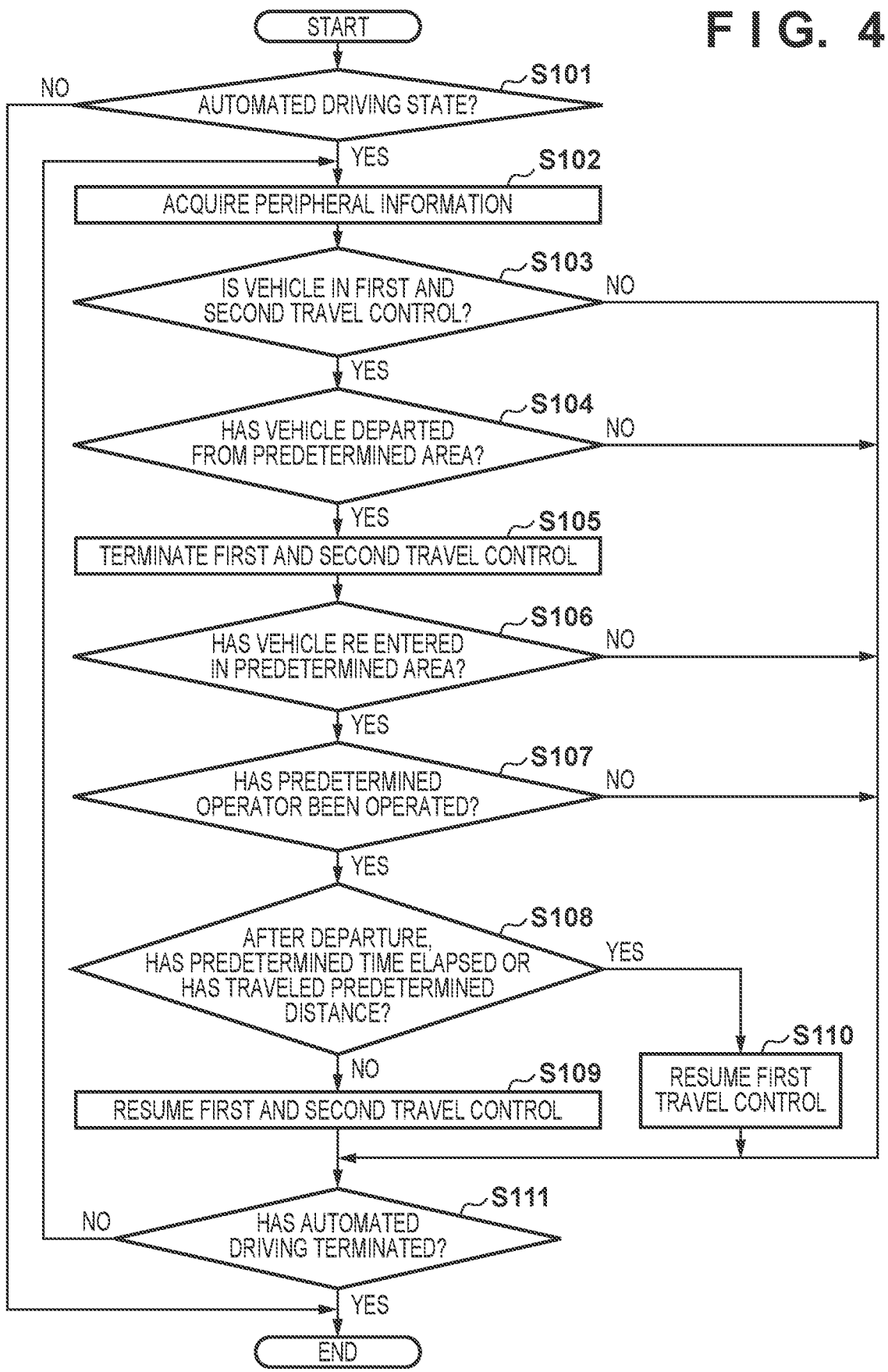
FIG. 4 is a flowchart illustrating an example of the automated driving process according to the first embodiment.

FIG. 4 is a flowchart illustrating the procedure of a process executed by the vehicle control apparatus according to this embodiment. The process contents of this flowchart are mainly executed by the ECU 20.

In step S101, the ECU 20 determines whether the vehicle 1 is in the automated driving state. If the vehicle 1 is in the automated driving state, the process advances to step S102. On the other hand, if the vehicle 1 is not in the automated driving state, this flowchart is terminated. In step S102, the ECU 20 acquires the peripheral information of the vehicle 1 from the ECUs 22 and 23.

In step S103, the ECU 20 determines whether the vehicle 1 is during the first travel control and the second travel control. More specifically, the ACC function is active during the first travel control, and the ACL function is active during the second travel control. Note that during the first travel control, LKAS (Lane Keep Assist System) may be active in addition to the ACC function. Alternatively, during the first travel control, LKAS (Lane Keep Assist System) may be active while the ACC function may be inactive. If it is determined that the vehicle 1 is during the first travel control and the second travel control, the process advances to step S104; otherwise, the process advances to step S111.

In step S104, the ECU 20 determines whether the vehicle 1 has departed from a predetermined area (for example, the main lane of an expressway). If it is determined that the vehicle 1 has departed from the predetermined area, the process advances to step S105. On the other hand, if it is determined that the vehicle 1 has not departed from the predetermined area, the process advances to step S111.

In step S105, the ECU 20 terminates both the first travel control and the second travel control. In step S106, the ECU 20 determines whether the vehicle 1 has reentered the predetermined area. For example, when the predetermined area is a motorway, if the vehicle 1 has departed from the motorway to a general road and then reentered the motorway, it is determined YES in step S106. If it is determined that the vehicle 1 has reentered the predetermined area, the process advances to step S107. On the other hand, if it is determined that the vehicle 1 has not reentered the predetermined area, the process advances to step S11.

In step S107, the ECU 20 determines whether a predetermined operator has been operated by the user (for example, the driver). The operation of a predetermined operator here is, for example, the operation of tilting the ACC set switch 302 toward the side of RES 302*a*. That is, it is the operation of turning on the resume function. If the predetermined operator has been operated, the process advances to step S108. On the other hand, if the predetermined operator has not been operated, the process advances to step S111.

In step S108, the ECU 20 determines whether a predetermined time has elapsed after the vehicle 1 has departed from the predetermined area or whether a predetermined distance has been traveled by the vehicle 1 after the vehicle 1 has departed from the predetermined area. Note that in this step, only either one of the predetermined time and the predetermined distance may be determined. Alternatively, both of them may be determined and, if at least one of them is determined YES, it may be determined YES in this step. If YES in this step, the process advances to step S110. On the other hand, if NO in this step, the process advances to step S109.

In step S109, the ECU 20 resumes both the first travel control and the second travel control. According to this step, the ACC set switch 302 is originally a switch for setting or resuming the ACC function (first travel control), but if it is operated in step S107, one operation of the ACC set switch 302 can resume both the first travel control (ACC) function and the second travel control (ALC) function.

In step S110, the ECU 20 resumes only the first travel control. Even when the vehicle 1 has reentered the predetermined area and the predetermined operator has been operated, if the predetermined time has elapsed after the vehicle 1 has initially departed from the predetermined area, the user may not have the need to resume the immediately preceding second travel control (ALC). Therefore, in this case, only the first travel control is resumed according to the original function of the ACC set switch 302.

In step S111, the ECU 20 determines whether the automated driving state of the vehicle 1 is terminated. If it is not terminated, the process returns to step S102 and a sequence of process is continued. Note that the sequence of process is repeated for, for example, a period of about 10 [msec] or a shorter period. On the other hand, if the process is terminated, the sequence of process is terminated.

Note that each step in this flowchart may be changed without departing from the scope of the present invention. For example, the order of the steps may be changed, a given step may be omitted, or another step may be added. For example, the processing in step S108 may not necessarily be executed. Further, the example has been described in which it is determined in step S107 whether the operation of tilting the ACC set switch 302 toward the side of RES 302*a* has been performed. However, if the ACC set switch 302 is tilted toward the side of SET 302*b* based on the user operation and the ACC function is turned on after the vehicle 1 has reentered the predetermined area, an operation guide instructing to perform an operation of turning on the ALC active switch 303 may be output. With this operation, if the user has started the first travel control (ACC), the user is prompted to start the second travel control. This can prevent the user from forgetting to start the second travel control.

<Timing Chart>

Figure 5:
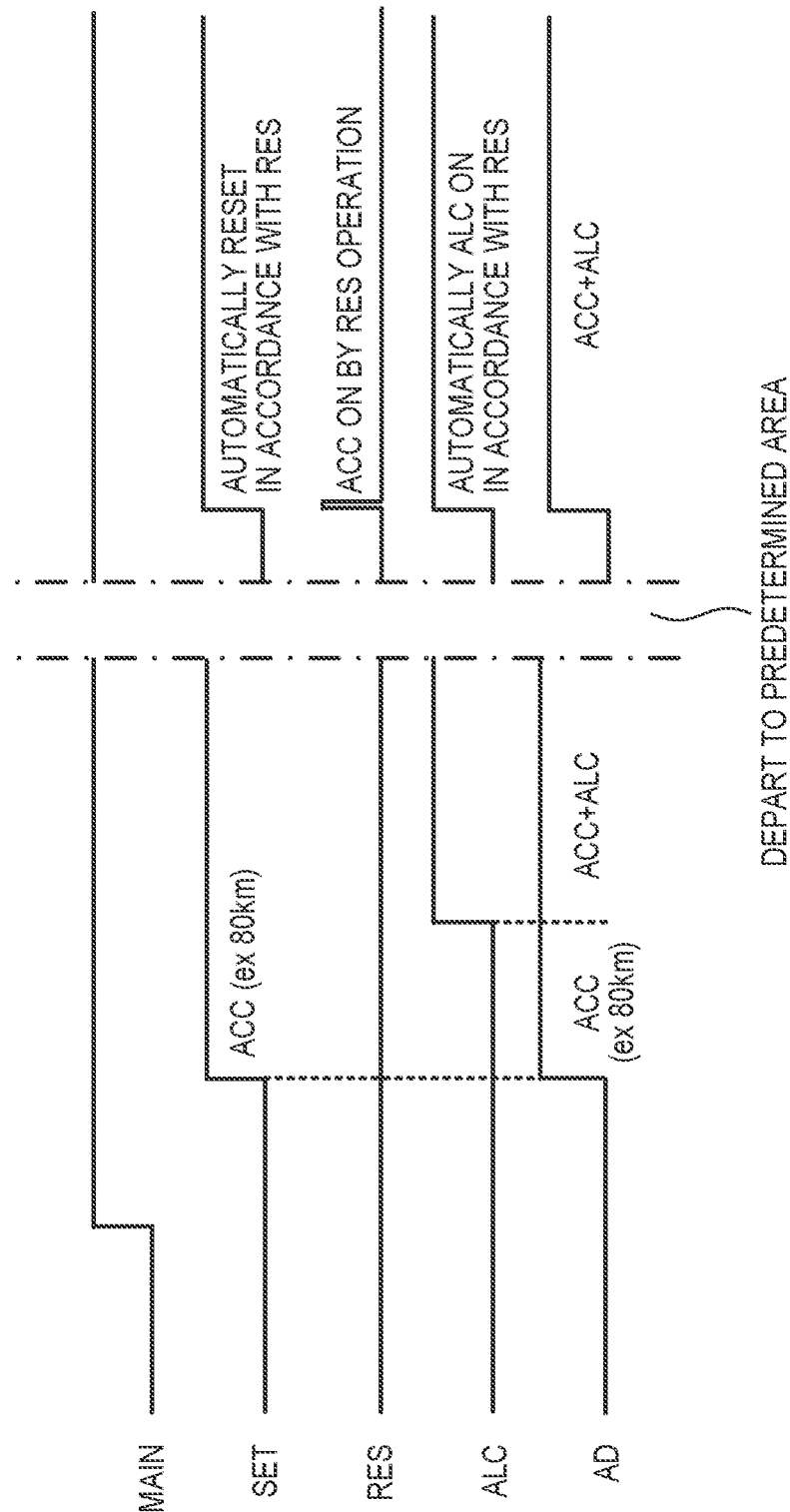
FIG. 5 is a view showing the state transition in the automated driving process according to the first embodiment.

With reference to FIG. 5, the state transition in the automated driving process according to this embodiment will be described. If the automated driving system main switch 301 is turned on, MAIN is set in the ON state. Thereafter, if the ACC set switch 302 is tilted toward the side of SET 302b based on a user operation, the ACC function is turned on. For example, the set vehicle speed may be the vehicle speed at the time of turning on the ACC function and may be, for example, 80 km/h. With this operation, the ACC of the automated driving (AD) is set in the ON state. Then, if the ALC active switch 303 is turned on, the ALC function is turned on, and automatic lane change of the vehicle 1 is enabled. That is, after the ALC is turned on, both the ACC and the ALC are active.

Consider a case in which the vehicle 1 has subsequently departed from the predetermined area. This is a case, for example, in which the vehicle 1 has moved from a motorway to a general road. In this case, both the ACC function and the ALC function are turned off. Assume that the vehicle 1 has subsequently reentered the predetermined area. In this state, if the ACC set switch 302 is tilted toward the side of RES 302a based on a user operation, both the ACC function and the ALC function are turned on again, so that the immediately preceding state is reflected. That is, the ACC is turned on with the set vehicle speed of 80 km/h, and the ALC is also turned on.

As has been described above, according to this embodiment, in a case in which, while two kinds of travel control functions (ACC and ALC) are active, a vehicle has departed from a predetermined area and these control functions are canceled, it is possible to activate the two functions by one action when the vehicle has returned to the predetermined area.

Therefore, when the user wants to restore the immediately preceding travel control, he/she can restore it with a simple operation. This can improve the user convenience.

Second Embodiment

In this embodiment, an example will be described in which even when a vehicle has departed from a predetermined area and returned there, if a user changes the course, not the ALC but only the ACC is resumed by tilting an ACC set switch toward the side of RES based on a user operation.

The arrangement of a vehicle and a vehicle control apparatus according to this embodiment is similar to that in the first embodiment, and a description thereof will be omitted.

<Process>

Figure 6:
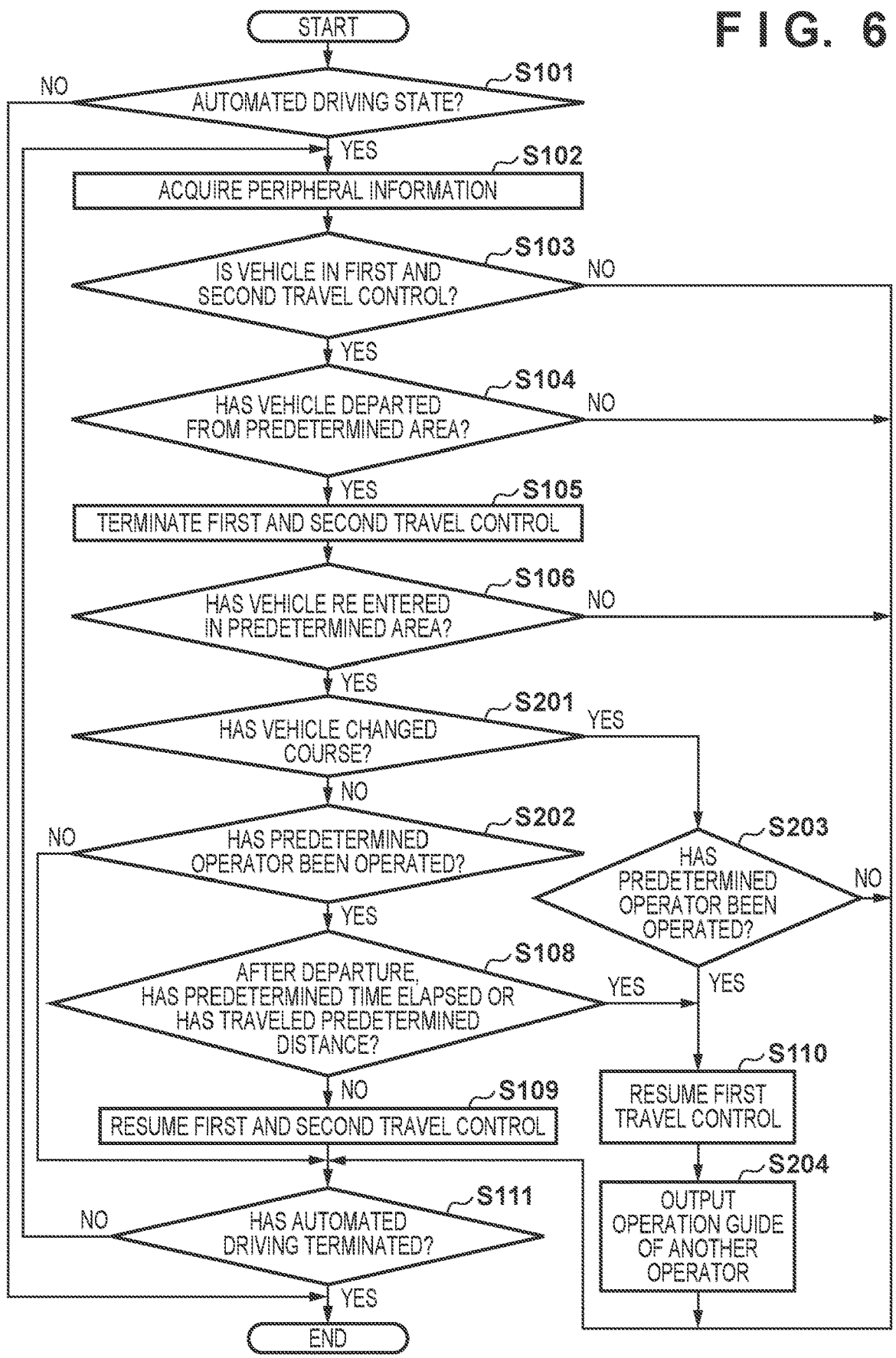
FIG. 6 is a flowchart illustrating an example of the automated driving process according to the second embodiment.

FIG. 6 is a flowchart illustrating the procedure of a process executed by a vehicle control apparatus according to this embodiment. The process contents of this flowchart are mainly executed by an ECU 20. Processing in each step denoted by the same step number as in the flowchart of FIG. 4 is similar to the processing described with reference to FIG. 4, so that a description thereof will be omitted.

In step S106, the ECU 20 determines whether a vehicle 1 has reentered a predetermined area. If it is determined that the vehicle 1 has reentered the predetermined area, the process advances to step S201. On the other hand, if it is determined that the vehicle 1 has not reentered the predetermined area, the process advances to step S111.

In step S201, the ECU 20 determines whether the vehicle 1 has changed course. For example, it is determined whether automatic lane change has been performed according to a user (driver) instruction. If it is determined that the vehicle 1 has changed course, the process advances to step S203. On the other hand, if it is determined that the vehicle 1 has not changed course, the process advances to step S202.

In step S202, the ECU 20 determines whether a predetermined operator has been operated by the user (for example, the driver). As in step S107, the operation of a predetermined operator here is, for example, the operation of tilting an ACC set switch 302 toward the side of RES 302a. That is, it is the operation of turning on the resume function. If the predetermined operator has been operated, the process advances to step S108. On the other hand, if the predetermined operator has not been operated, the process advances to step S111.

In step S203, the ECU 20 determines whether a predetermined operator has been operated by the user (for example, the driver). This is similar to the process contents in step S202. If the predetermined operator has been operated, the process advances to step S110. On the other hand, if the predetermined operator has not been operated, the process advances to step S111.

Note that each step in this flowchart may be changed without departing from the scope of the present invention. For example, the order of the steps may be changed, a given step may be omitted, or another step may be added.

As has been described above, in this embodiment, when the vehicle has departed from a predetermined area and returned there but the user changes the course, even if the ACC set switch is tilted toward the side of RES based on a user operation, only the ACC is resumed without resuming the ALC. If the user changes the course, the user may not desire to restore the setting similar to the previous setting. According to the arrangement of this embodiment, it is possible to prevent resumption of the function that does not meet the user's intention. This can further improve the convenience.

Third Embodiment

In this embodiment, an example will be described in which when a vehicle has departed from a predetermined area and returned there but the road environment has been greatly changed, even if an ACC set switch is tilted toward the side of RES based on a user operation, only the ACC is resumed without resuming the ALC.

The arrangement of a vehicle and a vehicle control apparatus according to this embodiment is similar to that in the first embodiment, and a description thereof will be omitted.

<Process>

Figure 7:
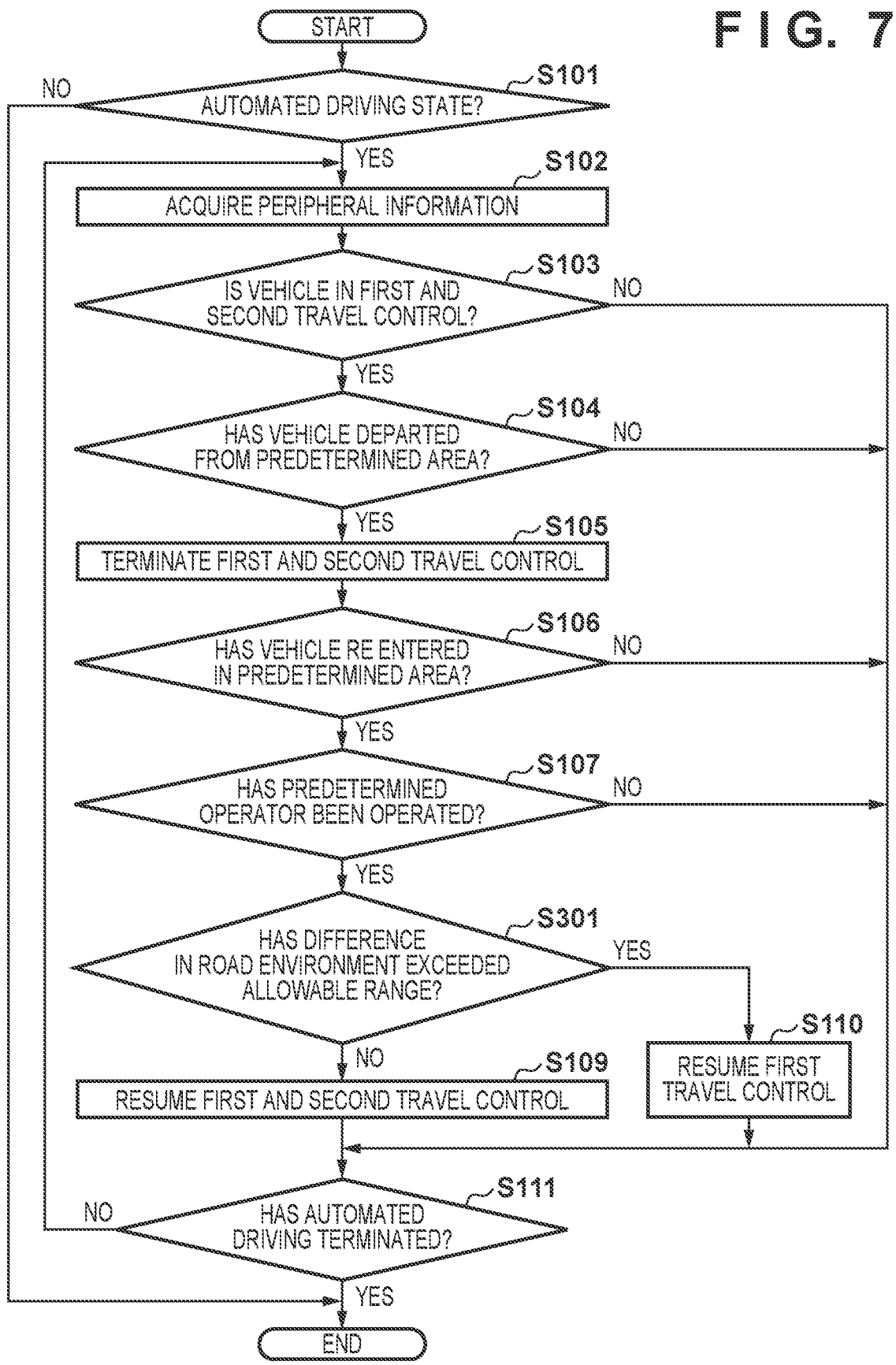
FIG. 7 is a flowchart illustrating an example of the automated driving process according to the third embodiment.

FIG. 7 is a flowchart illustrating the procedure of a process executed by a vehicle control apparatus according to this embodiment. The process contents of this flowchart are mainly executed by an ECU 20. Processing in each step denoted by the same step number as in the flowchart of FIG. 4 is similar to the processing described with reference to FIG. 4, so that a description thereof will be omitted. In this procedure, processing in step S301 is executed instead of processing in step S108.

In step S301, the ECU 20 determines whether a difference between the road environment at the time when the first travel control (ACC) and the second travel control (ALC) have been active before the vehicle 1 has departed from a predetermined area and the road environment at the time when the vehicle 1 has reentered the predetermined area exceeds an allowable range. The road environment here is the number of lanes or the upper limit of travel speed. The degree of congestion, the road width, or the like may be additionally considered. In a case in which the number of lanes differs by a predetermined number, the upper limit of travel speed differs by a predetermined speed or more, the degree of congestion differs by a predetermined degree or more, the road width differs by a predetermined value or more, or the like, it may be determined that the difference between the road environments exceeds the allowable range. If it is determined that the difference between the road environments exceeds the allowable range, the process advances to step S110. On the other hand, if the difference between the road environment does not exceed the allowable range, the process advances to step S111.

As has been described above, in this embodiment, if the difference between the road environment at the time when the first travel control (ACC) and the second travel control (ALC) have been active before the vehicle 1 has departed from a predetermined area and the road environment at the time when the vehicle 1 has reentered the predetermined area exceeds the allowable range, even if the user operates a predetermined operator, control is executed such that the first travel control (ACC) is resumed but the second travel control (ALC) is not resumed.

There is a case in which, due to a change in road environment, it is inappropriate to restore the immediately preceding state. In such a case, it is possible to prevent resumption of the unnecessary function.

Note that each step in this flowchart may be changed without departing from the scope of the present invention. For example, the order of the steps may be changed, a given step may be omitted, or another step may be added.

For example, in this embodiment, the example has been described in which processing in step S301 is executed instead of processing in step S108, but the present invention is not limited to this example. The step of determining whether a predetermined time has elapsed or a predetermined distance has been traveled after the departure from a predetermined area, which has been described in step S108, may be further executed. For example, step S301 may be executed between step S108 and step S109 of FIG. 4.

As has been described above, according to this embodiment, in a case in which, due to a change in road environment, it is inappropriate to restore the immediately preceding state, it is possible to prevent resumption of the unnecessary function.

Fourth Embodiment

In this embodiment, an example will be described in which while two kinds of travel control functions (ACC and ALC) are active, if these control functions are canceled at the same timing, the two functions are activated with one action.

The arrangement of a vehicle and a vehicle control apparatus according to this embodiment is similar to that in the first embodiment, and a description thereof will be omitted.

<Process>

Figure 8:
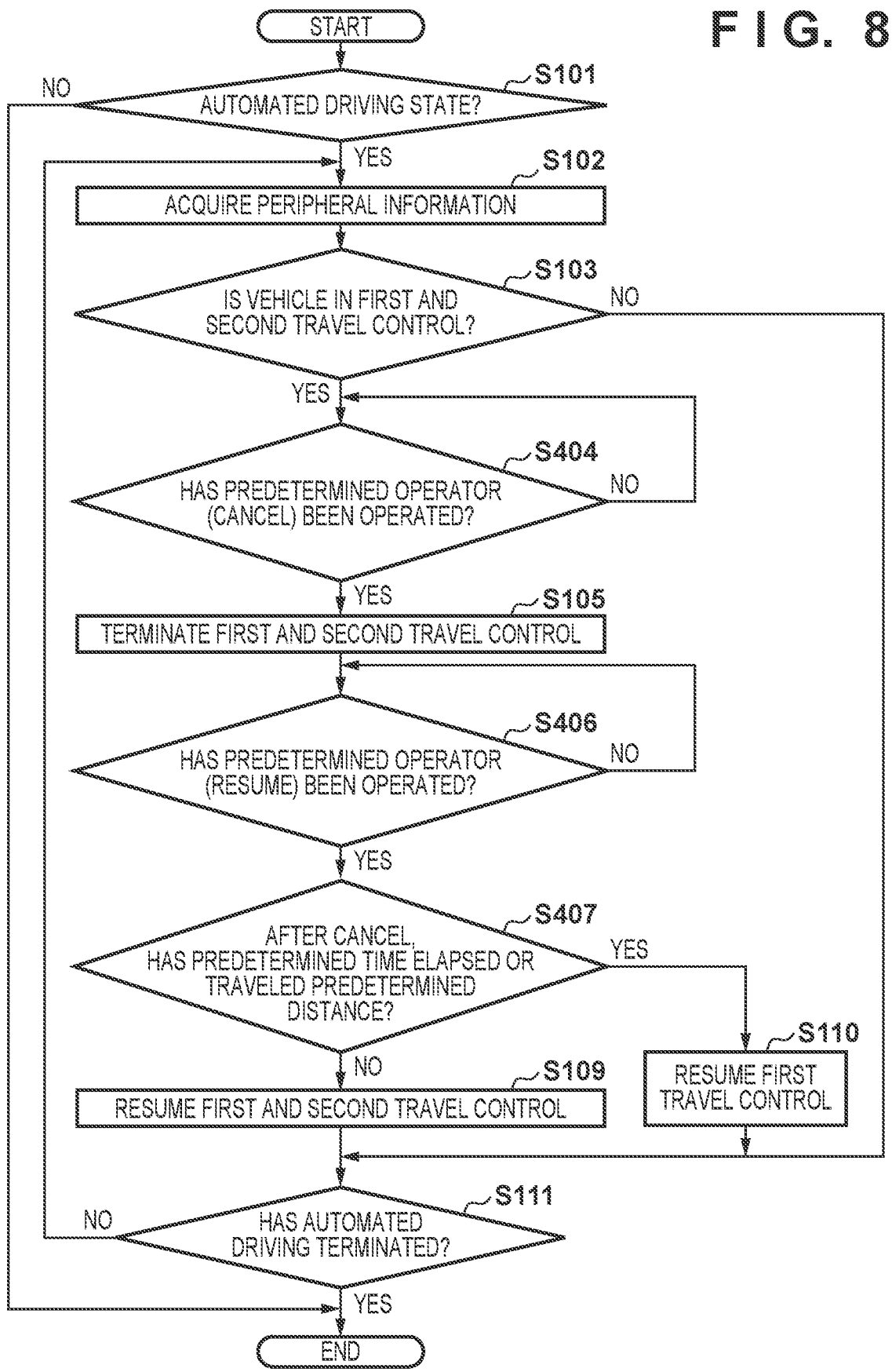
FIG. 8 is a flowchart illustrating an example of the automated driving process according to the fourth embodiment.

FIG. 8 is a flowchart illustrating the procedure of a process executed by a vehicle control apparatus according to this embodiment. The process contents of this flowchart are mainly executed by an ECU 20. Each step similar to the step of FIG. 4 in the first embodiment is given the same step number as in FIG. 4, and a detailed description thereof will be omitted.

The process from step S101 to S103 is similar to that illustrated in FIG. 4.

In step S404, the ECU 20 determines whether a predetermined operator has been operated by the user (for example, the driver). The operation of a predetermined operator here is, for example, the operation of pressing a cancel switch 304. That is, it is the operation of turning on the cancel function. The cancel operation here is a terminating operation of terminating the first travel control and the second travel control. If the predetermined operator has been operated, the process advances to step S105. On the other hand, if the predetermined operator has not been operated, the process waits.

The processing in step S105 is similar to that in FIG. 4.

In step S406, the ECU 20 determines whether a predetermined operator has been operated by the user (for example, the driver). The operation of a predetermined operator here is, for example, the operation of tilting an ACC set switch 302 toward the side of RES 302a, that is, the operation of turning on the resume function. The operation of turning on the resume function is a resume operation of resuming the first travel control and the second travel control. If the predetermined operator has been operated, the process advances to step S407. On the other hand, if the predetermined operator has not been operated, the process waits.

In step S407, the ECU 20 determines whether a predetermined time has elapsed after the operation of the predetermined operator (cancel switch 304), that is, the terminating operation of terminating the first travel control and the second travel control has been performed in step S404, or whether a vehicle 1 has traveled a predetermined distance after the terminating operation of terminating the first travel control and the second travel control has been performed. Note that in this step, only either one of the predetermined time and the predetermined distance may be determined. Alternatively, both of them may be determined and, if at least one of them is determined YES, it may be determined YES in this step. If YES in this step, the process advances to step S110. On the other hand, if NO in this step, the process advances to step S109. Processing in each of steps S109 and S110 is similar to that illustrated in FIG. 4. Then, a sequence of process illustrated in FIG. 8 is terminated.

<Timing Chart>

With reference to FIG. 9, the state transition in the automated driving process according to this embodiment will be described. If an automated driving system main switch 301 is turned on, MAIN is set in the ON state. Thereafter, if the ACC set switch 302 is tilted toward the side of SET 302b based on a user operation, the ACC function is turned on. For example, the set vehicle speed may be the vehicle speed at the time of turning on the ACC function and may be, for example, 80 km/h. With this operation, the ACC of the automated driving (AD) is set in the ON state. Then, if an ALC active switch 303 is turned on, the ALC function is turned on, and automatic lane change of the vehicle 1 is enabled. That is, after the ALC is turned on, both the ACC and the ALC are active. The contents so far are similar to the contents described with reference to FIG. 5.

Consider a case in which the cancel switch 304 is subsequently operated (pressed). In this case, both the ACC function and the ALC function are turned off. In this state, if the ACC set switch 302 is tilted toward the side of RES 302a based on a user operation, both the ACC function and the ALC function are turned on again, so that the immediately preceding state is reflected. That is, the ACC is turned on with the set vehicle speed of 80 km/h, and the ALC is also turned on.

As has been described above, according to this embodiment, while two kinds of travel control functions (ACC and ALC) are active, if these control functions are canceled at the same timing by the operation of the cancel switch 304, it is possible to activate the two functions by one action of tilting the ACC set switch 302 toward the side of RES 302a.

According to the present invention, it becomes possible to restore the original travel control state with a simple operation. Therefore, the user (driver) convenience can be improved.

Summary of Embodiment

The vehicle control apparatus (for example, 2) according to the first aspect is a vehicle control apparatus that controls a vehicle (for example, 1) based on peripheral information of the vehicle, comprising a first operator (for example, 302, 302b) used to start first travel control (for example, ACC (Adaptive Cruise Control) and/or LKAS (Lane Keep Assist System)), a second operator (for example, 302, 302a) used to resume the first travel control after the first travel control has been terminated, a third operator (for example, 303) used to further start second travel control (for example, ALC (Automatic Lane Change)) during the first travel control, and a control unit (for example, 20) configured to, while the first travel control and the second travel control are active, if the first travel control and the second travel control are terminated based on the same condition or the same timing (for example, a departure of the vehicle from a predetermined area or a press of the cancel switch 304), resume the first travel control and the second travel control in accordance with an operation of the second operator.

According to the first aspect, it becomes possible to restore the original travel control state with a simple operation. Therefore, the user (driver) convenience can be improved.

In the vehicle control apparatus (for example, 2) according to the second aspect, while the first travel control and the second travel control are active, if the first travel control and the second travel control are terminated based on different conditions or different timings, the control unit resumes the first travel control in accordance with an operation of the second operator but does not resume the second travel control.

According to the second aspect, if the first travel control and the second control are individually terminated, the user (driver) may desire only one of them. In such as case, it is possible to prevent restoration of the original state against the user's intention.

In the vehicle control apparatus (for example, 2) according to the third aspect, the same condition is one of that the vehicle has departed from a predetermined area (for example, an expressway) and that a driver of the vehicle has performed an operation of terminating the first travel control and the second travel control (for example, a press of the cancel switch 304).

According to the third aspect, it is possible to resume, with a simple operation, the first travel control and the second travel control which have been terminated in accordance with a departure of the vehicle from the predetermined area. Further, if the user has terminated the first travel control and the second travel control by himself/herself, it is possible to resume the first travel control and the second travel control with a simple operation.

In the vehicle control apparatus (for example, 2) according to the fourth aspect, if the vehicle has reentered the predetermined area before a predetermined time has elapsed or a predetermined distance has been traveled by the vehicle since the vehicle has departed from the predetermined area, the control unit resumes the first travel control and the second travel control in accordance with an operation of the second operator (for example, No in step S108, step S109), and if the vehicle has reentered the predetermined area after the predetermined time has elapsed or the predetermined distance has been traveled by the vehicle since the vehicle has departed from the predetermined area, the control unit resumes the first travel control in accordance with an operation of the second operator but does not resume the second travel control (for example, YES in step S108, step S110).

According to the fourth aspect, if not much time has elapsed since the departure from the predetermined area and it is estimated that the user intends to restore the original travel control, it is possible to restore the original travel control. Therefore, it becomes possible to execute control that further meets user's intention.

In the vehicle control apparatus (for example, 2) according to the fifth aspect, even when the vehicle has reentered the predetermined area after the first travel control and the second travel control has been terminated, if the vehicle changes a course in the predetermined area, the control unit resumes the first travel control in accordance with an operation of the second operator but does not resume the second travel control (for example, YES in step S201, YES in step S203, step S110).

According to the fifth aspect, for example, if the user changes the course, it can be considered that there is a situation in which the user does not want to reset the travel control such as automatic lane change. In such a case, it is possible to suppress the unnecessary restoration.

In the vehicle control apparatus (for example, 2) according to the sixth aspect, if the vehicle has reentered the predetermined area and the first operator has been operated, the control unit outputs an operation guide of the third operator.

According to the sixth aspect, if the user has started the first travel control, it is possible to prevent the user from forgetting to start the second travel control by prompting the user to start the second travel control.

In the vehicle control apparatus (for example, 2) according to the seventh aspect, if a difference between a road environment at the time when the first travel control and the second travel control have been active before the vehicle has departed from the predetermined area and a road environment at the time when the vehicle has reentered the predetermined area exceeds an allowable range, the control unit executes control such that the second travel control is not resumed even if the second operator is operated (for example, YES in step S301, step S110).

According to the seventh aspect, if a change in road environment is large, the immediately preceding travel control is not restored. This can reduce user's sense of insecurity.

In the vehicle control apparatus (for example, 2) according to the eighth aspect, the road environment includes one of the number of lanes and an upper limit of travel speed.

According to the eighth aspect, if the number of lanes or the upper limit of travel speed is different between before the departure from the predetermined area and after the reentry following the departure, the immediately preceding travel control is not restored. This can reduce user's sense of insecurity.

In the vehicle control apparatus (for example, 2) according to the ninth aspect, the predetermined area is a main lane area of a motorway and does not include a connection road (for example, a junction).

According to the ninth aspect, it is possible to prevent restoration of the travel control when the vehicle is located outside the main lane area of a motorway. This can prevent restoration of the control such as the ALC which is not desired to be used except on a motorway.

In the vehicle control apparatus (for example, 2) according to the 10th aspect, the second travel control is control that can be activated when the vehicle is located in the predetermined area.

According to the 10th aspect, the control can be executed only when, for example, the vehicle is located in a predetermined area such as an expressway. This can further improve the safety of the occupant.

In the vehicle control apparatus (for example, 2) according to the 11th aspect, when the control unit executes control such that the second travel control is not resumed even if the second operator is operated, the control unit outputs an operation guide of the third operator (for example, step S204).

According to the 11th aspect, if the second travel control is not automatically resumed, this can be notified to the user. In addition, the second travel control can be restored by the user operating another operator as needed.

The vehicle (for example, 1) according to the 12th aspect comprises the vehicle control apparatus according to any one of the first to 1th aspects.

According to the 12th aspect, it is possible to implement the function of the vehicle control apparatus on the vehicle.

The operation method of the vehicle control apparatus (for example, 2) according to the 13th aspect is an operation method of a vehicle control apparatus that controls a vehicle (for example, 1) based on peripheral information of the vehicle, the apparatus comprising a first operator (for example, 302, 302b) used to start first travel control (for example, ACC (Adaptive Cruise Control) and/or LKAS (Lane Keep Assist System)), a second operator (for example, 302, 302a) used to resume the first travel control after the first travel control has been terminated, and a third operator (for example, 303) used to further start second travel control (for example, ALC (Automatic Lane Change)) during the first travel control, and the method comprising while the first travel control and the second travel control are active, if the first travel control and the second travel control are terminated based on the same condition or the same timing, resuming the first travel control and the second travel control in accordance with an operation of the second operator.

According to the 13th aspect, it becomes possible to restore the original travel control state with a simple operation. Therefore, the user (driver) convenience can be improved.

The program according to the 14th aspect is a program for causing a computer to function as the vehicle control apparatus according to any one of the first to eighth aspects.

According to the 14th aspect, the operation of the vehicle control apparatus according to any one of the first to eighth aspects can be implemented by the computer.

Others

A program that implements one or more functions described in each embodiment is supplied to a system or an apparatus via a network or a storage medium, and one or more processors in the computer of the system or the apparatus can read out and execute this program. The present invention can also be implemented by such embodiments.

The invention is not limited to the foregoing embodiments, and various variations/changes are possible within the spirit of the invention.

What is claimed is:

1. A vehicle control apparatus that controls a vehicle based on peripheral information of the vehicle, comprising:
    a first operator used to start first travel control;
    a second operator used to resume the first travel control after the first travel control has been terminated;
    a third operator used to further start second travel control during the first travel control; and
    a control unit configured to, while the first travel control and the second travel control are active, if the first travel control and the second travel control are terminated based on the same condition or the same timing, resume the first travel control and the second travel control in accordance with an operation of the second operator,
    wherein while the first travel control and the second travel control are active, if the first travel control and the second travel control are terminated based on different conditions or different timings, the control unit resumes the first travel control in accordance with an operation of the second operator but does not resume the second travel control.

2. The apparatus according to claim 1, wherein the same condition is one of that the vehicle has departed from a predetermined area and that a manipulator of the vehicle has performed an operation of terminating the first travel control and the second travel control.

3. The apparatus according to claim 2, wherein
    if the vehicle has reentered the predetermined area before a predetermined time has elapsed or a predetermined distance has been traveled by the vehicle since the vehicle has departed from the predetermined area, the control unit resumes the first travel control and the second travel control in accordance with an operation of the second operator, and
    if the vehicle has reentered the predetermined area after the predetermined time has elapsed or the predetermined distance has been traveled by the vehicle since the vehicle has departed from the predetermined area, the control unit resumes the first travel control in accordance with an operation of the second operator but does not resume the second travel control.

4. The apparatus according to claim 2, wherein even when the vehicle has reentered the predetermined area after the first travel control and the second travel control has been terminated, if the vehicle changes a course in the predetermined area, the control unit resumes the first travel control in accordance with an operation of the second operator but does not resume the second travel control.

5. The apparatus according to claim 2, wherein if the vehicle has reentered the predetermined area and the first operator has been operated, the control unit outputs an operation guide of the third operator.

6. The apparatus according to claim 2, wherein if a difference between a road environment at the time when the first travel control and the second travel control have been active before the vehicle has departed from the predetermined area and a road environment at the time when the vehicle has reentered the predetermined area exceeds an allowable range, the control unit executes control such that the second travel control is not resumed even if the second operator is operated.

7. The apparatus according to claim 6, wherein the road environment includes one of the number of lanes and an upper limit of travel speed.

8. The apparatus according to claim 2, wherein the predetermined area is a main lane area of a motorway and does not include a connection road.

9. The apparatus according to claim 2, wherein the second travel control is control that can be activated when the vehicle is located in the predetermined area.

10. The apparatus according to claim 1, wherein when the control unit executes control such that the second travel control is not resumed even if the second operator is operated, the control unit outputs an operation guide of the third operator.

11. A vehicle comprising a vehicle control apparatus defined in claim 1.

12. An operation method of a vehicle control apparatus that controls a vehicle based on peripheral information of the vehicle, the apparatus comprising:

a first operator used to start first travel control;

a second operator used to resume the first travel control after the first travel control has been terminated; and a third operator used to further start second travel control during the first travel control;

the method comprising:

controlling such that, while the first travel control and the second travel control are active, if the first travel control and the second travel control are terminated based on the same condition or the same timing, the first travel control and the second travel control are resumed in accordance with an operation of the second operator, and while the first travel control and the second travel control are active, if the first travel control and the second travel control are terminated based on different conditions or different timings, the first travel control is resumed in accordance with an operation of the second operator but the second travel control is not resumed.

13. A non-transitory computer-readable storage medium storing a program for causing a computer to function as a vehicle control apparatus defined in claim 1.

* * * * *